United States Patent
Nishimoto

(10) Patent No.: US 12,546,392 B2
(45) Date of Patent: Feb. 10, 2026

(54) DRUM TYPE TRANSMISSION

(71) Applicant: KANZAKI KOKYUKOKI MFG. CO., LTD., Amagasaki (JP)

(72) Inventor: Shuji Nishimoto, Amagasaki (JP)

(73) Assignee: KANZAKI KOKYUKOKI MFG. CO., LTD., Amagasaki (JP)

( * ) Notice: Subject to any disclaimer, the term of this patent is extended or adjusted under 35 U.S.C. 154(b) by 0 days.

(21) Appl. No.: 19/083,938

(22) Filed: Mar. 19, 2025

(65) Prior Publication Data
US 2025/0305579 A1 Oct. 2, 2025

(30) Foreign Application Priority Data
Mar. 29, 2024 (JP) ................................ 2024-056762

(51) Int. Cl.
*F16H 63/34* (2006.01)
*F16H 63/18* (2006.01)

(52) U.S. Cl.
CPC ......... *F16H 63/18* (2013.01); *F16H 63/3425* (2013.01); *F16H 63/3491* (2013.01)

(58) Field of Classification Search
CPC ... F16H 63/18; F16H 63/3425; F16H 63/3491
See application file for complete search history.

(56) References Cited

U.S. PATENT DOCUMENTS

| | | | | |
|---|---|---|---|---|
| 2010/0108460 A1* | 5/2010 | Nakamura | .......... | F16H 63/3416 192/219.5 |
| 2018/0328487 A1* | 11/2018 | Nishimoto | .......... | F16H 63/3466 |
| 2022/0163111 A1* | 5/2022 | Nishimoto | .......... | F16H 63/3466 |
| 2023/0043711 A1* | 2/2023 | Marand | ............... | F16H 63/3425 |
| 2023/0272852 A1* | 8/2023 | Itoh | .................... | F16H 63/3466 192/219.5 |

FOREIGN PATENT DOCUMENTS

| | | | |
|---|---|---|---|
| JP | 2013209025 A | 10/2013 |
| JP | 5909400 B2 | 4/2016 |
| JP | 2020173010 A | 10/2020 |

* cited by examiner

*Primary Examiner* — Lori Wu
(74) *Attorney, Agent, or Firm* — CANTOR COLBURN LLP

(57) ABSTRACT

[Problem] To improve reliability of a park lock mechanism in a drum type transmission of an electric shift type with a simple constitution. [Solution] A drum type transmission includes a park lock mechanism having a park pawl engaged with or disengaged from a park concave-convex portion of a park gear relatively non-rotatably disposed on a transmission shaft, a park pawl operation member for engaging the park pawl with the park concave-convex portion when a drum member is in a park position and releasing the engagement when the drum member is out of the park position, and an assist cam for assisting a movement of the park pawl in a direction in which the park pawl is released from the park concave-convex portion when the drum member is rotated from the park position toward a transmission position or a neutral position. The assist cam is disposed at one end portion of an assist operation shaft that is rotated by power branched from a shift operation gear train.

4 Claims, 7 Drawing Sheets

DRUM TYPE TRANSMISSION

CROSS REFERENCE TO RELATED APPLICATIONS

The present invention claims priority under 35 U.S.C. § 119 to Japanese Application No. 2024-056762 filed Mar. 29, 2024, the entire content of which is incorporated herein by reference.

TECHNICAL FIELD

The present invention relates to a drum type transmission having a park lock mechanism.

BACKGROUND ART

As a transmission used in a traveling system transmission path or the like in a work vehicle, such as a utility vehicle or a tractor, a drum type transmission of an electric gear shift type in which a gear shift operation is performed by driving an electric motor has been proposed (for example, see Patent Document 1).

Such a drum type transmission includes shift gears relatively rotatably supported by a counter shaft, transmission gears relatively non-rotatably supported by a main shaft and directly or indirectly meshed with the shift gears, shifter members relatively non-rotatably and axially movably supported by the counter shaft, a drum member having fork guide grooves and operated to rotate about an axis, a fork shaft extending in parallel to the drum member, and shift forks having boss portions axially movably supported by the fork shaft, engagement pin portions engaged in the fork guide grooves, and fork portions engaged with the shifter members.

More specifically, the shifter members and the shift gears have respective shift concave-convex portions on their opposing end surfaces. When the drum member is rotated about the axis, the shift forks whose positions in the axial direction are restricted by the fork guide grooves are moved in the axial direction, so that the shifter members are engaged with the transmission gears. As a result, a gear train including the shift gears and the transmission gears is brought into a power transmission state, and power transmission between the main shaft and the counter shaft is performed at a speed ratio of the gear train.

The rotating operation of the drum member is performed by the drive of the electric motor. Such a drum type transmission employing an electric gear shift has a shift operation gear train having multiple deceleration stages for transmitting power between an output shaft of the electric motor and a drum shaft of the drum member.

In addition to the power transmission state by the gear train, it is desired that a parking lock state, which is a forced rotation stop state, be reliably produced in the drum type transmission. In this regard, it has been proposed to forcibly stop the rotation of the counter shaft by engaging a park pawl, which is engaged with and disengaged from a park gear supported by the counter shaft so as not to be rotatable relative to the counter shaft, with the park gear in accordance with the rotation of the drum member to a park position (see, for example, Patent Document 2). In this drum type transmission, an assist cam for assisting the park pawl in a direction away from the park gear when the drum member is rotated from the park position to a transmission position is provided at one end of a transmission operation shaft for rotating the drum member, so that a parking lock state can be forcibly released.

Furthermore, as another embodiment, an example is also disclosed in which an assist cam for assisting the park pawl in a direction in which the park pawl meshes with the park gear when the drum member is rotated from a transmission position or a neutral position toward the park position is provided so that a parking lock state can be securely maintained.

PRIOR ART DOCUMENT

Patent Document

Patent Document 1: Japanese Patent No. 5909400
Patent Document 2: Japanese Unexamined Patent Application Publication No. 2020-173010

SUMMARY OF INVENTION

Technical Problem

In the drum type transmission of Patent Document 2, for motorizing the gear shift operation, a multistage shift operation gear train for transmitting power between the output shaft of the electric motor and the transmission operation shaft is required since a rotational speed of the electric motor rotating at a high speed is considerably reduced before the rotational speed is transmitted to the drum shaft. Therefore, the number of components is increased, and furthermore, an assist cam for improving reliability of the park lock mechanism is required to be disposed along with the shift operation gear train, and accordingly, there is a room for improvement.

The present invention has been made in view of the above-described conventional techniques, and an object of the present invention is to improve the reliability of a park lock mechanism with a simple configuration while a drum type transmission that performs a shift operation by a drive force of an electric motor is configured to be compact.

Solution to Problem

According to an aspect of the present invention, a drum type transmission including a transmission shaft having a plurality of shift gears, a drum member that is rotated about a drum shaft so that a shift operation is performed to a park position, a neutral position, or a transmission position, and a shift operation gear train for transmitting a drive force of an electric motor to the drum shaft, includes a park pawl that is engaged with and disengaged from a park gear disposed on the transmission shaft in a relative rotation unavailable manner, a park pawl operation member that engages the park pawl with the park gear when the drum member is in the park position and disengages the park pawl from the park gear when the drum member is out of the park position, and an assist cam that assists a movement of the drum member in a direction in which the park pawl is disengaged from the park gear when the drum member is rotated from the park position toward the transmission position or the neutral position, or in a direction in which the park pawl is engaged with the park gear when the drum member is rotated from the transmission position or the neutral position toward the park position. The assist cam is disposed at one end portion of an assist operation shaft which is rotated by power branched from the shift operation gear train.

According to the aspect of the present invention, the drum type transmission has a separate path for releasing the park pawl separately from a main path (for locking the park pawl) connecting the electric motor to the drum shaft. Accordingly, even when the park pawl is still engaged with the park gear and is not restored from the parking lock state, the park pawl can be surely released by forcibly moving the park pawl in the separate path, and therefore, the reliability of the park lock mechanism can be improved. Furthermore, since the assist cam is disposed on the one end portion of the assist operation shaft which is rotated by the power (separate path) branched from the shift operation gear train (main path), the assist cam can be operated with a simple configuration.

The drum type transmission according to the aspect may further include an intermediate gear shaft that is positioned between the assist operation shaft and the drum shaft and that extends in parallel to the assist operation shaft and the drum shaft, a first shift operation gear train that transmits power between the intermediate gear shaft and an output shaft of the electric motor and a second shift operation gear train that transmits power between the intermediate gear shaft and the drum shaft, the first and second shift operation gear trains constituting the shift operation gear train, and an assist gear train that transmits power between the intermediate gear shaft and the assist operation shaft. Furthermore, the first shift operation gear train may include a plurality of gears that are individually supported to be freely rotatable by the assist operation shaft and the intermediate gear shaft.

According to the aspect, the shift operation gear train connected from the electric motor to the drum shaft can be formed by using the assist operation shaft including the assist cam on the one end portion. Thus, the assist operation shaft having the assist cam can be disposed without increase in the number of components, and the reliability of the park lock mechanism in the drum type transmission can be improved with a low-cost and compact configuration without causing a significant increase in manufacturing cost.

The drum type transmission according to the aspect, an end portion of the drum shaft extends to an outside of a cover that covers the shift operation gear train, and a manual transmission operation portion is disposed on the end portion of the drum shaft in a relative rotation unavailable manner.

According to the aspect, when the electric motor becomes inoperable, an operator can manually operate the manual transmission operation portion to rotate the drum shaft and perform a gear shift operation. Furthermore, even when a drive force of the electric motor is insufficient at a time of releasing the parking lock state and the parking lock state is not restored, the operator can manually operate the manual transmission operation portion to rotate the assist operation shaft via the drum shaft to operate the assist cam, so that the parking lock state can be forcibly released.

Advantageous Effects of Invention

According to the present invention, the reliability of a park lock mechanism in a drum type transmission that performs a shift operation by a drive force of an electric motor can be improved with a simple configuration.

DESCRIPTION OF EMBODIMENTS

Figure 1:
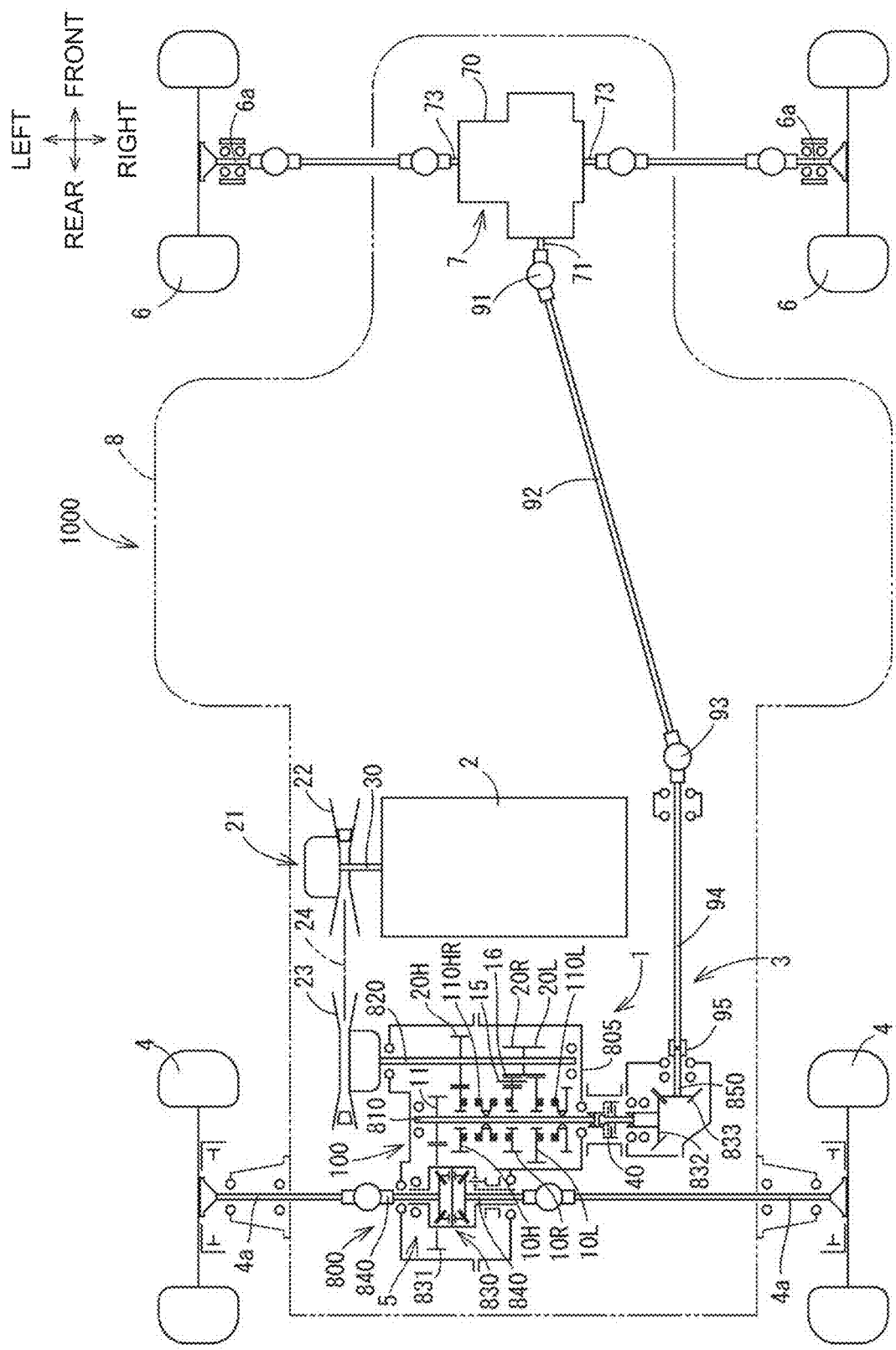
FIG. 1 is a schematic plan view illustrating, as a partially skeleton view, a power transmission mechanism of a vehicle to which an embodiment of a drum type transmission mechanism is applied.

Hereinafter, an embodiment embodying the present invention will be described with reference to the accompanying drawings. FIG. 1 is a diagram schematically illustrating power transmission of a work vehicle 1000 to which a drum type transmission 1 according to this embodiment is applied. The drum type transmission 1 is suitably used in a traveling system transmission path of work vehicles, such as a tractor and a utility vehicle. First, a schematic configuration of the work vehicle 1000 will be described with reference to FIG. 1.

The work vehicle 1000 includes a vehicle body 8, an engine 2 as a drive source supported by the vehicle body 8, rear wheels 4 and front wheels 6 supported by the vehicle body 8, and a drum type transmission 1 interposed in a power transmission mechanism 3 extending from the engine 2 to the rear wheels 4 or the front wheels 6 which act as drive wheels.

The power transmission mechanism 3 transmits power of the engine 2 to a front transaxle 7 disposed in front of the engine 2 through the drum type transmission 1 included in a transmission 800 disposed behind the engine 2. The power is also transmitted to a rear transaxle 5 disposed in the transmission 800 via the drum type transmission 1.

The power transmission mechanism 3 includes a belt transmission 21 driven by the engine 2, and the transmission 800 having the drum type transmission 1 driven by the belt transmission 21 and the rear transaxle 5. The rear transaxle 5 drives the pair of right and left rear wheels 4 and a pair of rear axles 4a. Furthermore, the front transaxle 7 is disposed in front of the engine 2 for driving the pair of right and left front wheels 6 and a pair of front axles 6a. An output of the drum type transmission 1 is distributed and transmitted to the rear transaxle 5 and the front transaxle 7.

As illustrated in FIG. 1, the belt transmission 21 includes a drive pulley 22 and a driven pulley 23 arranged in a front-rear direction, and a belt 24 as an endless body is wound around the drive pulley 22 and the driven pulley 23. The drive pulley 22 is attached to a power output shaft 30 of the engine 2 extending in a right-left direction of a vehicle body in a relative rotation unavailable manner, and the driven pulley 23 is attached to a power input shaft 820 of the transmission 800 extending in the right-left direction of the vehicle body in a relative rotation unavailable manner. The power output shaft 30 serves as a rotation center shaft (pulley shaft) of the drive pulley 22, and the power input shaft 820 serves as a rotation center shaft (pulley shaft) of the driven pulley 23. The belt transmission 21 is a continuously variable transmission (CVT) configured to continuously change an output/input rotational speed ratio by changing widths of pulley grooves of the pulleys 22 and 23 in accordance with a change in a rotational speed of the engine 2. Note that the power input shaft 820 of the transmission 800 constitutes a power input shaft of the drum type transmission 1 disposed in the transmission 800.

The rear transaxle 5 includes a rear wheel differential gear mechanism 830 that is disposed in the transmission 800 and that receives an output of the drum type transmission 1, and a pair of right and left rear wheel output shafts 840 extending in the right-left direction. The rear wheel output shafts 840 protrude outward to the right and left from a transmission housing 805 and are connected to the corresponding rear axles 4a of the right and left rear wheels 4 in an interlocking manner via universal joints and transmission shafts. The rear wheel differential gear mechanism 830 is incorporated in the transmission housing 805, and the right and left rear wheel output shafts 840 are differentially connected to each other via the rear wheel differential gear mechanism 830.

The front transaxle 7 includes a front transaxle housing 70 which supports an input shaft 71 extending in a forward direction of the vehicle body in a plan view and a pair of right and left output shafts 73 extending in the right-left direction. The output shafts 73 of the front transaxle 7 project outward in the right-left direction from the front transaxle housing 70 and are operatively connected to the front axles 6a of the right and left front wheels 6 via universal joints and transmission shafts. A front wheel differential mechanism (not illustrated) is incorporated in the front transaxle housing 70, and the right and left output shafts 73 are differentially connected to each other via the front wheel differential mechanism. A rear end portion of the input shaft 71 protrudes rearward from the front transaxle housing 70, and is connected to a front end portion of a front wheel output shaft 850 protruding forward from the transmission housing 805 of the transmission 800, via a universal joint 91, a front power transmission shaft 92, a universal joint 93, a rear power transmission shaft 94, and a shaft joint 95 in this order from the front side.

In this embodiment, in the work vehicle 1000, both the rear wheels 4 and the front wheels 6 act as drive wheels. Specifically, the work vehicle 1000 has the pair of right and left rear wheels 4 that act as main drive wheels, and the pair of right and left front wheels 6 that act as auxiliary drive wheels and also act as steered wheels, and a rotational power shifted by the drum type transmission 1 is operatively transmitted to the rear wheels 4 and the front wheels 6.

Figure 2:
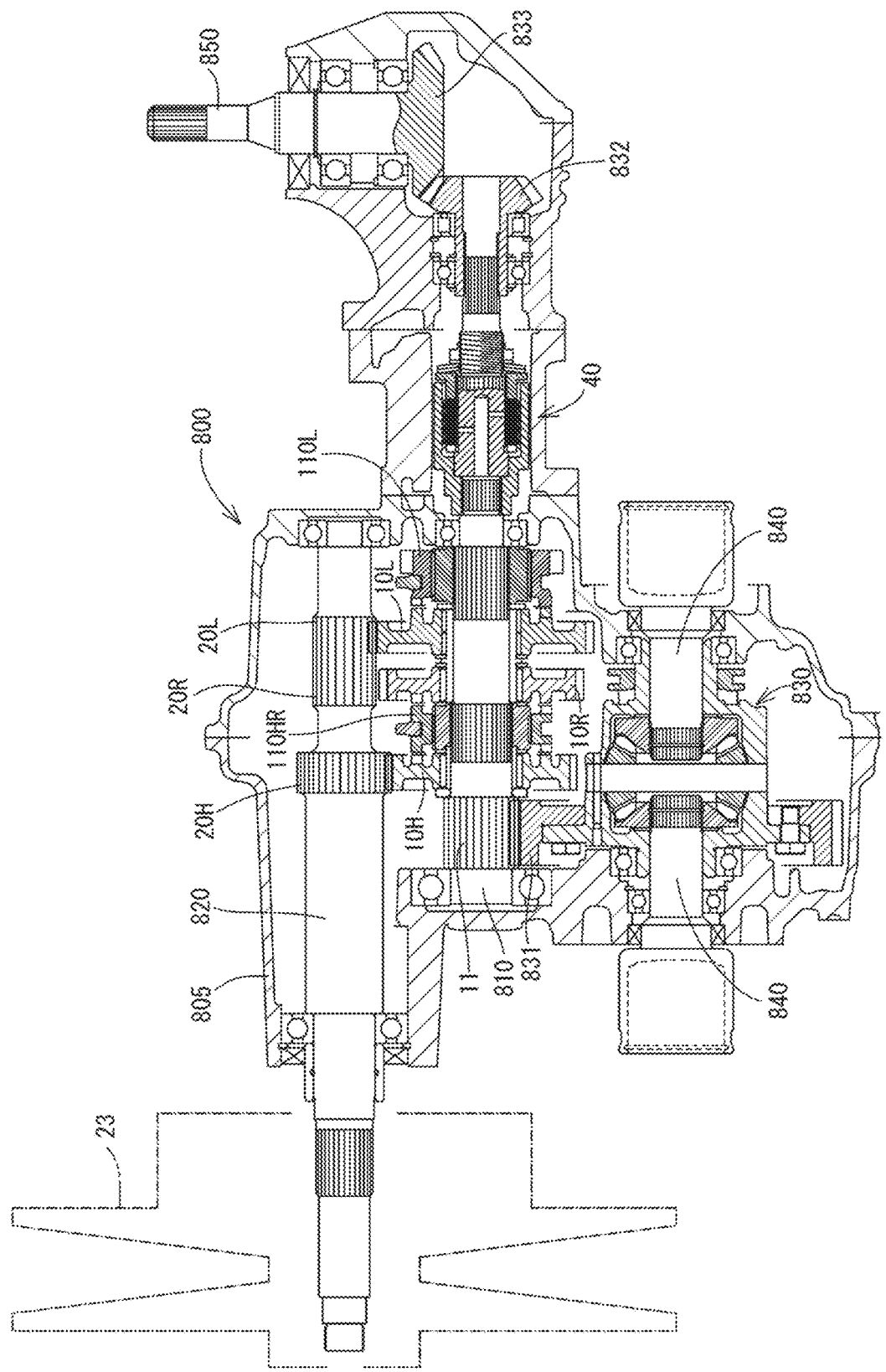
FIG. 2 is a cross-sectional view schematically illustrating the drum type transmission mechanism according to the embodiment which is developed along a transmission shaft, a power input shaft, a rear wheel output shaft, and a front wheel output shaft.
Figure 3:
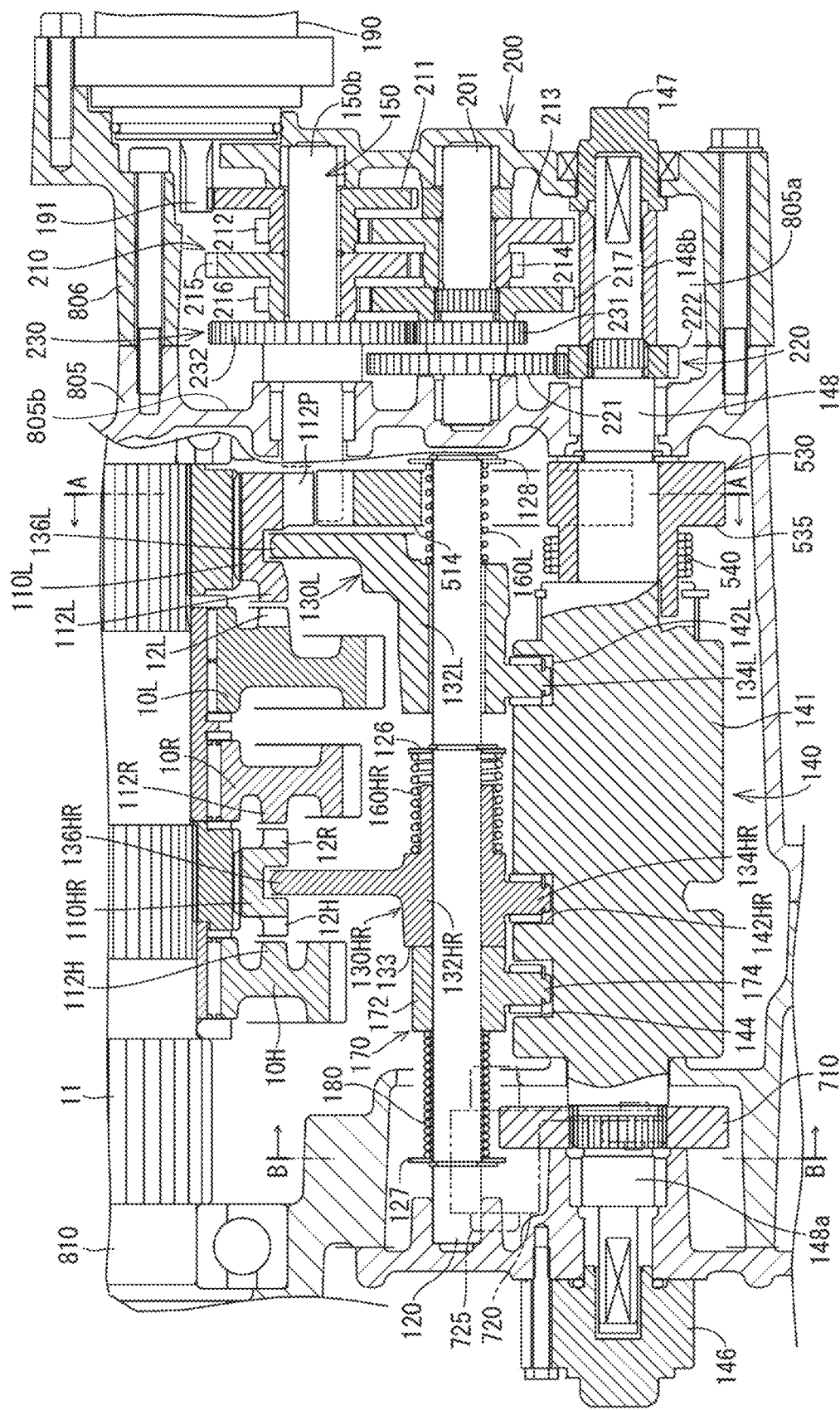
FIG. 3 is a cross-sectional view schematically illustrating the drum type transmission mechanism according to the embodiment, which is developed along the transmission shaft, a fork shaft, and a drum shaft, together with a shift operation gear train, and corresponds to a C-C position.

Next, the drum type transmission 1 will be described with reference to FIG. 1 to FIG. 3. FIG. 2 is a cross-sectional view illustrating the drum type transmission 1 developed along a transmission shaft 810, the power input shaft 820, the rear wheel output shaft 840, and the front wheel output shaft 850. FIG. 3 is a cross-sectional view illustrating the drum type transmission 1 developed along the transmission shaft 810, a fork shaft 120, and a drum shaft 148.

The drum type transmission 1 can changeably transmit a rotational power between the transmission shaft 810 and the power input shaft 820 disposed in parallel to each other. Specifically, as illustrated in FIG. 1 to FIG. 3, the drum type transmission 1 includes shift gears 10 supported on the transmission shaft 810 in a relative rotation available manner, transmission gears 20 supported on (or integrally formed with) the power input shaft 820 in a relative rotation unavailable manner and directly or indirectly meshed with the shift gears 10, and a drum type transmission operation mechanism 100 for selectively bringing the shift gears 10 into a power transmission state.

In this embodiment, the shift gears 10 include a forward high-speed shift gear 10H, a forward low-speed shift gear 10L, and a reverse shift gear 10R. The transmission gears 20 include a transmission gear 20H that meshes with the shift gear 10H to form a forward high-speed gear train together with the shift gear 10H, a transmission gear 20L that meshes with the shift gear 10L to form a forward low-speed gear train together with the shift gear 10L, and a transmission gear 20R that meshes with the shift gear 10R via a reverse idle gear 15 (see FIG. 6) to form a reverse gear train together with the shift gear 10R and the reverse idle gear 15.

Note that, in this embodiment, the power input shaft 820 functions as a transmission input shaft that operatively inputs a rotational power from a drive source, such as the engine 2, and the transmission shaft 810 functions as a transmission output shaft that outputs a rotational power after shifting to the drive wheels. A transmission output gear 11 that meshes with a final gear 831 of the rear wheel differential gear mechanism 830 is fixed to the transmission shaft 810, and the transmission shaft 810 rotates together with the rear wheels 4. Furthermore, a driven bevel gear 833 attached to a rear end of the front wheel output shaft 850 in a relative rotation unavailable manner meshes with a drive bevel gear 832 attached to one end portion (a right end portion in this embodiment) of the transmission shaft 810 via a torque limiter 40, and a rotational power of the transmission shaft 810 is also transmitted to the front wheel output shaft 850.

That is, as illustrated in FIG. 1 and FIG. 2, the transmission 800 includes the transmission housing 805, the power input shaft 820 that is supported by the transmission housing 805 in an axially rotatable manner with one end portion thereof extending outward so as to be operatively connected to the engine 2 serving as the drive source and that acts as a transmission input shaft, the transmission shaft 810 that is supported by the transmission housing 805 in an axially rotatable manner and that serves as a transmission output shaft, and the drum type transmission 1 for variably transmitting a rotational power from the power input shaft 820 to the transmission shaft 810 in multiple stages.

The transmission 800 further includes the rear transaxle 5 having a pair of left and right rear wheel output shafts 840, and a rear wheel differential gear mechanism 830 that differentially transmits the rotational power operatively input from the transmission output shaft (the transmission shaft 810) to the pair of left and right rear wheel output shafts 840. The transmission 800 also includes the front wheel output shaft 850 that outputs a rotational power of the transmission shaft 810 to a transmission path different from the rear wheel output shaft 840.

The drum type transmission operation mechanism 100 selectively brings the plurality of shift gears 10 into a power transmission state to bring the drum type transmission 1 into a desired shift stage engagement state.

More specifically, as illustrated in FIG. 1 to FIG. 3, the drum type transmission operation mechanism 100 includes shifter members 110 supported by the transmission shaft 810 so as to be relatively non-rotatable and axially movable and selectively engaged with the shift gears 10 by axial movement, a fork shaft 120 extending in parallel to the transmission shaft 810, shift forks 130 supported by the fork shaft 120 so as to be axially movable, and a drum member 140 that is rotated about an axis extending in parallel to the transmission shaft 810.

Specifically, the shifter members 110 and the shift gears 10 have transmission concave-convex portions 112 and 12, respectively, at end surfaces thereof facing each other, and by moving the shifter members 110 along the axial direction in a direction approaching the shift gears 10, the transmission concave-convex portions 112 of the shifter members 110 are engaged with the transmission concave-convex portions 12 of the shift gears 10, whereby the shift gears 10 enter a power transmission state of integrally rotating with the transmission shaft 810 via the shifter members 110.

As illustrated in FIG. 1 to FIG. 3, in this embodiment, the shift gear 10H, the shift gear 10R, and the shift gear 10L are disposed on the transmission shaft 810 in this order from the left side to the right side in the axial direction.

The drum type transmission operation mechanism 100 includes a first shifter member 110HR supported by the transmission shaft 810 between the shift gears 10H and 10R so as to be relatively non-rotatable and axially movable, and engaged with the shift gears 10H and 10R in a concave-convex manner as the first shifter member 110HR moves to the left and right in the axial direction, and a second shifter member 110L supported by the transmission shaft 810 at a position opposed to the shift gear 10L so as to be relatively non-rotatable and axially movable, and engaged with the shift gear 10L in a concave-convex manner as the second shifter member 110L moves to a side closer to the shift gear 10L in the axial direction.

The first shifter member 110HR has a high-speed concave-convex portion 12H capable of concave-convex engagement with a transmission concave-convex portion 112H of the shift gear 10H at a left end surface thereof in the axial direction facing the shift gear 10H, and has a reverse concave-convex portion 12R capable of concave-convex engagement with a transmission concave-convex portion 112R of the shift gear 10R at a right end surface thereof in the axial direction facing the shift gear 10R.

The second shifter member 110L has a low-speed concave-convex portion 112L capable of concave-convex engagement with a transmission concave-convex portion 12L of the shift gear 10L at a left end surface thereof in the axial direction facing the shift gear 10L.

Furthermore, as illustrated in FIG. 3, the drum type transmission operation mechanism 100 includes, as the shift forks 130, first and second shift forks 130HR and 130L for moving the first and second shifter members 110HR and 110L in the axial direction.

As illustrated in FIG. 3 and the like, the first shift fork 130HR has a first boss portion 132HR supported by the fork shaft 120 so as to be axially movable, a first engagement pin portion 134HR engaged in a first fork guide groove 142HR formed in the drum member 140, and a first fork portion 136HR engaged with the first shifter member 110HR, and moves the first shifter member 110HR on the transmission shaft 810 in the axial direction in response to its axial movement on the fork shaft 120.

Specifically, the first shift fork 130HR and the first shifter member 110HR can take, as axial direction positions, a non-engagement position at which the first shifter member 110HR is not engaged with any of the shift gear 10H and the shift gear 10R in a concave-convex manner, a high-speed position at which the first shifter member 110HR is engaged with the shift gear 10H in a concave-convex manner, and a reverse position at which the first shifter member 110HR is engaged with the shift gear 10R in a concave-convex manner. Note that, in FIG. 3, a state in which the first shift fork 130HR and the first shifter member 110HR are positioned in the non-engagement position is illustrated.

The second shift fork 130L has a second boss portion 132L supported by the fork shaft 120 so as to be axially movable, a second engagement pin portion 134L engaged in a second fork guide groove 142L formed in the drum member 140, and a second fork portion 136L engaged with the second shifter member 110L, and moves the second shifter member 110L on the transmission shaft 810 in the axial direction in response to its axial movement on the fork shaft 120.

Specifically, the second shift fork 130L and the second shifter member 110L can take, as axial direction positions, a non-engagement position at which the second shifter member 110L does not engage with the shift gear 10L in a concave-convex manner and a low-speed position at which the second shifter member 110L is engaged with the shift gear 10L in a concave-convex manner. Note that, in FIG. 3, a state in which the second shift fork 130L and the second shifter member 110L are positioned in the non-engagement position is illustrated.

The drum member 140 is rotated about an axis of the drum shaft 148 in accordance with a transmission operation. The drum member 140 and the drum shaft 148 are supported by the transmission housing 805 so as to be axially rotatable.

Figure 6:
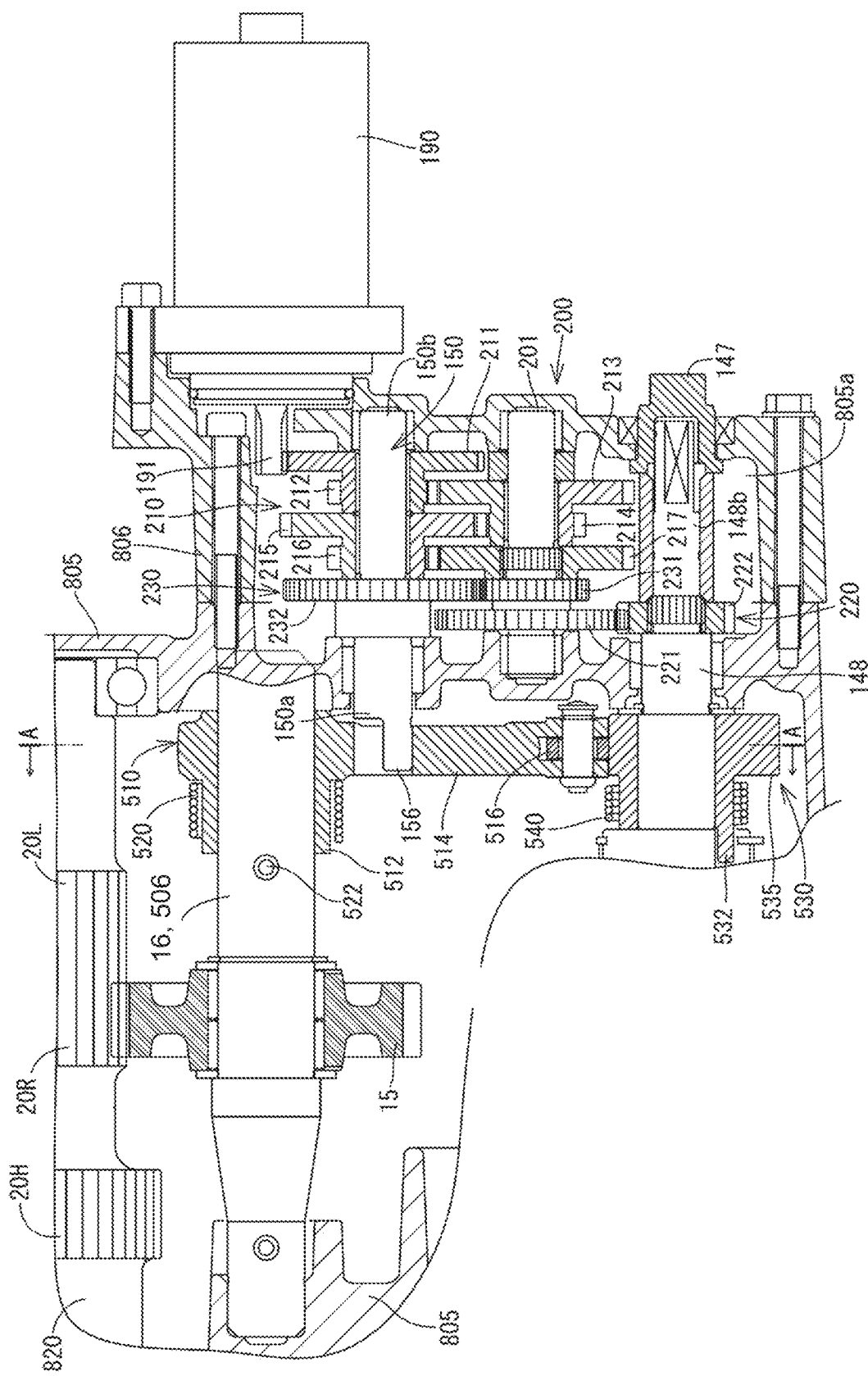
FIG. 6 is a cross-sectional view schematically illustrating a section developed along a power input shaft, a reverse idle shaft, an assist operation shaft, and a drum shaft, together with a shift operation gear train, and corresponds to a D-D position in FIG. 4.

As illustrated in FIG. 3 and FIG. 6, the drum type transmission operation mechanism 100 includes an electric motor 190 that is driven in accordance with a transmission operation. The drum member 140 is operatively connected to a shift drive gear 191 constituted by a pinion gear fixed to an output shaft of the electric motor 190.

The electric motor 190 is attached to an outer wall of a shift gear chamber cover 806 disposed in the transmission housing 805 such that the shift drive gear 191 is disposed so as to extend in the right-left direction of the vehicle in parallel to the drum shaft 148. In this embodiment, the shift drive gear 191 is operatively connected to the drum member 140 via a shift operation gear train 200.

As illustrated in FIG. 3, the drum member 140 includes a drum main body 141 including the fork guide grooves (first and second fork guide grooves 142HR and 142L in this embodiment) formed therein, and the drum shaft 148 that supports the drum main body 141 coaxially with the drum main body 141.

As illustrated in FIG. 3, the drum type transmission operation mechanism 100 further includes a first shift fork pushing spring 160HR for pushing the first boss portion 132HR to the left in the axial direction, a slider member 170 fitted and supported onto the fork shaft 120 on the left side of the first boss portion 132HR so as to be movable in the axial direction, and a slider member pushing spring 180 for pushing the slider member 170 to the right in the axial direction.

The first shift fork pushing spring 160HR is set so as to push the first boss portion 132HR to the left side in the axial direction with a biasing force capable of moving the first shifter member 110HR to a high-speed position where the first shifter member 110H is engaged with the shift gear 10H in a concave-convex manner when the first shift fork 130HR is in a free state.

Specifically, the first shift fork pushing spring 160HR has a right end portion in the axial direction serving as a fixed end portion locked to a locking member 126 disposed on the fork shaft 120, and a left end portion in the axial direction serving as a movable end portion engaged with a right end surface in the axial direction of the first boss portion 132HR.

The slider member 170 is supported by the fork shaft 120 so as to be movable in the axial direction in a state in which a movement end to the right side in the axial direction is defined by a stopping portion 133 disposed on the first boss portion 132HR, and a position of the slider member 170 in the axial direction is restricted by a slider guide groove 144 formed in the drum member 140.

Specifically, the slider member 170 includes a slider main body 172 fitted onto the first boss portion 132HR so as to be movable in the axial direction, and a slider engagement pin portion 174 engaged with the slider guide groove 144.

The slider member pushing spring 180 is configured to push the slider member 170 to the right in the axial direction with a biasing force larger than that of the first shift fork pushing spring 160HR.

That is, the slider member pushing spring 180 is set to push the first boss portion 132HR to the right in the axial direction via the slider member 170 with a biasing force capable of moving the first shifter member 110HR to a reverse position where the first shifter member 110HR is engaged with the shift gear 10R in a concave-convex manner against the biasing force of the first shift fork pushing spring 160HR that biases the first shift fork 130HR to a first side in the axial direction in a free state of the first shift fork 130HR and the slider member 170.

Specifically, the slider member pushing spring 180 has a left end portion in the axial direction as a fixed end portion locked to a locking member 127 disposed on the fork shaft 120, and a right end portion in the axial direction as a movable end portion engaged with a left end surface in the axial direction of the slider member 170.

In this embodiment, as illustrated in FIG. 3, the drum type transmission operation mechanism 100 further includes a second shift fork pushing spring 160L that pushes the second boss portion 132L in a direction in which the second shifter member 110L is pushed toward the shift gear 10L.

As described above, in this embodiment, the shift gear 10L is positioned on the left side in the axial direction of the second shifter member 110L, and therefore, the second shift fork pushing spring 160L pushes the second boss portion 132L to the left side in the axial direction.

Specifically, the second shift fork pushing spring 160L has a right end portion in the axial direction serving as a fixed end portion locked to a locking member 128 disposed on the fork shaft 120, and a left end portion in the axial direction serving as a movable end portion engaged with a right end surface in the axial direction of the second boss portion 132L.

The second shift fork pushing spring 160L is set to push the second boss portion 132L with a biasing force capable of moving the second shifter member 110L to the low-speed position where the second shifter member 110L is engaged with the shift gear 10L in a concave-convex manner in a free state of the second shift fork 130L.

In the drum type transmission 1, the drum member 140 is configured to take an operation position about the axis corresponding to a transmission stage (including a neutral stage) that the drum type transmission 1 can take.

In this embodiment, the drum type transmission 1 may take a neutral stage, a forward high-speed stage, a forward low-speed stage, and a reverse stage. Therefore, the drum member 140 takes a neutral position, a high-speed position, a low-speed position, and a reverse position about the axis.

Specifically, in this embodiment, the drum member 140 may take the high-speed position when being rotated from the neutral position to one side about the axis, the low-speed position when being further rotated from the high-speed position to the one side about the axis, and the reverse position when being rotated from the neutral position to the other side about the axis.

The drum type transmission 1 may further take a park stage, and the drum member 140 may take a park position in addition to the operation positions described above. In this embodiment, the drum member 140 takes the park position when being further rotated from the reverse position toward the other side about the axis. A configuration for realizing the parking lock state will be described later.

Figure 7:
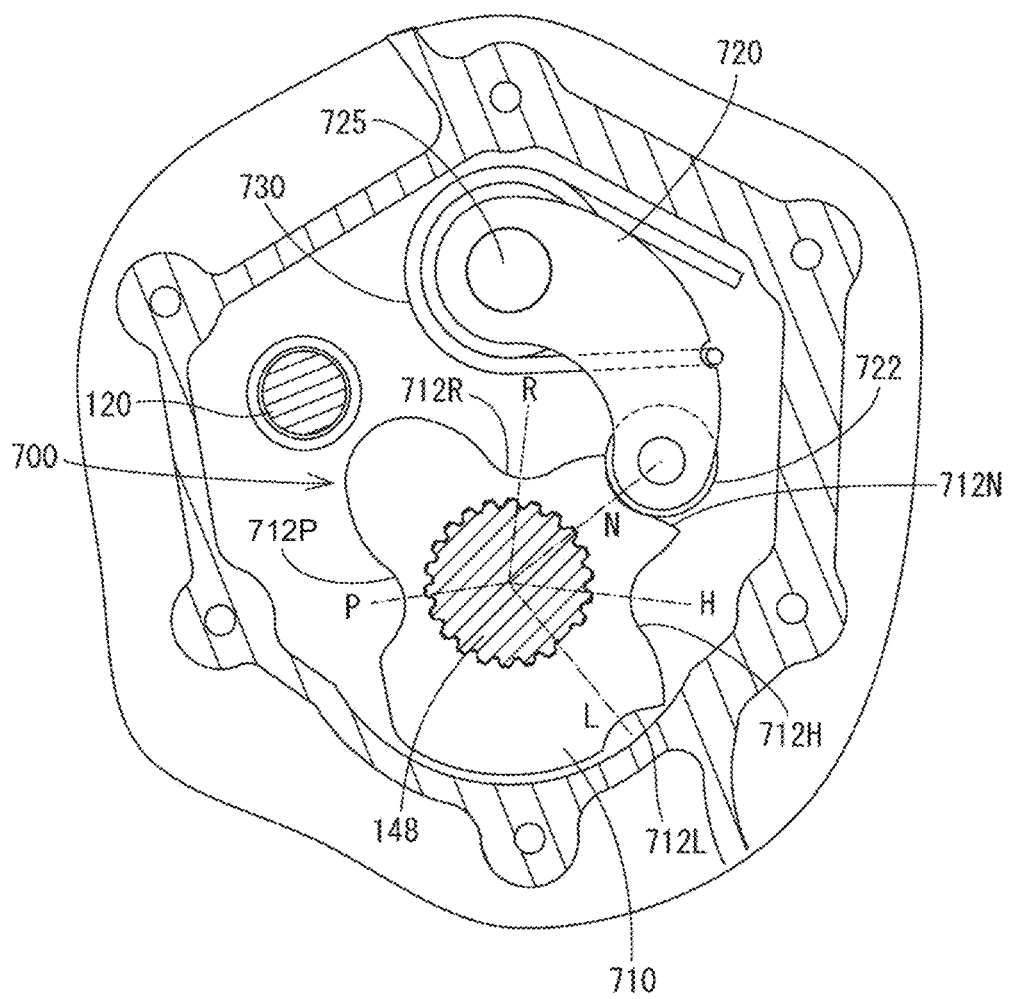
FIG. 7 is a cross-sectional view schematically illustrating a detent mechanism corresponding to a B-B position in FIG. 3.

The drum type transmission operation mechanism 100 further includes a detent mechanism 700 for locking the drum member 140 in each of the operation positions. FIG. 7 is a cross-sectional view schematically illustrating the detent mechanism 700 corresponding to a B-B position in FIG. 3. As illustrated in FIG. 3 and FIG. 7, the detent mechanism 700 includes a detent plate 710 supported at one end portion 148a (left end portion in this embodiment) of the drum shaft 148 of the drum member 140 so as not to be relatively rotatable, a detent arm 720 supported so as to be rotatable about a detent shaft 725 extending in parallel to the drum member 140, and a detent spring 730. As illustrated in FIG. 3, an angle sensor 146 for detecting a position of the drum member 140 around the axial line is attached to the one end portion 148a of the drum shaft 148.

A detent plate 710 has a plurality of detent recesses 712 corresponding to the operation positions that the drum member 140 can take. The detent recesses 712 include a neutral position recess 712N, a high-speed position recess 712H, a low-speed position recess 712L, a reverse position recess 712R, and a parking position recess 712P. In FIG. 7, a state in which the drum member 140 is positioned at the neutral position N is illustrated.

The detent arm 720 has a base end portion rotatably supported by the detent shaft 725 and a free end portion having an engaging portion 722 that can be engaged with the detent recesses 712. In this embodiment, the detent arm 720 has at the free end portion thereof, a roller which is rotatable about a rotation axis parallel to the detent shaft 725, and this roller acts as the engaging portion 722.

The detent spring 730 biases the detent arm 720 around the detent shaft 725 such that the engaging portion 722 of the detent arm 720 is pressed toward the detent plate 710. Since the detent mechanism 700 is provided, it is possible to effectively prevent the drum member 140 and the drum shaft 148 from being unintentionally rotated from the operation positions.

In the drum type transmission 1, an intermittent rotation of the drum member 140 causes the shift forks 130HR and 130L to be fed stepwise in accordance with groove shapes of the fork guide grooves 142HR and 142L and the slider guide groove 144. As a result, the drum type transmission 1 is set to any one of a forward low-speed state, a forward high-speed state, a reverse drive state, a neutral state, and the parking lock state. A configuration similar to that of the drum type transmission 1 of this embodiment is disclosed in, for example, Japanese Unexamined Patent Application Publication No. 2018-91376.

As is apparent from FIG. 3, the drum member 140 is rotated about the axis of the drum shaft 148 in response to drive of the electric motor 190 operatively connected via the shift operation gear train 200. The shift drive gear 191 is attached to the output shaft of the electric motor 190 so as not to be relatively rotatable. The electric motor 190 rotates the shift drive gear 191 in conjunction with an operation of a transmission operation tool (a lever, a pedal, a dial, or the like), not illustrated. A shift driven gear 222 is attached to the other end portion 148*b* (the right end portion in this embodiment) of the drum shaft 148 so as not to be relatively rotatable. The shift operation gear train 200 transmits power between the shift drive gear 191 and the shift driven gear 222.

In this embodiment, the shift operation gear train 200 has four deceleration stages and one acceleration stage. The shift operation gear train 200 includes two gear shafts, that is, an assist operation shaft 150 and an intermediate gear shaft 201. The assist operation shaft 150 and the intermediate gear shaft 201 are disposed in parallel to the drum shaft 148.

In the shift operation gear train 200, a first large-diameter gear 211 rotatably supported by the assist operation shaft 150 meshes with the shift drive gear 191 of the electric motor 190 to form a first deceleration stage. A first small-diameter gear 212 having a smaller diameter than the first large-diameter gear 211 is rotatably supported on the assist operation shaft 150. The first large-diameter gear 211 and the first small-diameter gear 212 are disposed so as not to be rotatable relative to each other.

The first small-diameter gear 212 meshes with a second large-diameter gear 213 rotatably supported by the intermediate gear shaft 201, thereby forming a second deceleration stage. A second small-diameter gear 214 having a smaller diameter than the second large-diameter gear 213 is rotatably supported on the intermediate gear shaft 201. The second large-diameter gear 213 and the second small-diameter gear 214 are disposed so as not to be relatively rotatable. The second small-diameter gear 214 meshes with a third large-diameter gear 215 rotatably supported by the assist operation shaft 150 to form a third deceleration stage. A third small-diameter gear 216 having a smaller diameter than the third large-diameter gear 215 is rotatably supported on the assist operation shaft 150. The third large-diameter gear 215 and the third small-diameter gear 216 are provided so as not to be relatively rotatable.

The third small-diameter gear 216 meshes with a fourth large-diameter gear 217, which is relatively non-rotatably supported by the intermediate gear shaft 201, to form a fourth deceleration stage. A fifth large-diameter gear 221 that meshes with the shift driven gear 222 of the drum shaft 148 to constitute an acceleration stage is relatively non-rotatably supported by the intermediate gear shaft 201. The gears 211 to 217, the intermediate gear shaft 201, and the gear 221 are rotated in accordance with driving of the electric motor 190, and the shift driven gear 222 and the drum shaft 148 are rotated in conjunction with the rotations of the gears and the shaft.

In this embodiment, the shift operation gear train 200 includes a first shift operation gear train 210 that transmits power between the intermediate gear shaft 201 extending in parallel to the assist operation shaft 150 and the shift drive gear 191 of the electric motor 190, and a second shift operation gear train 220 that transmits power between the intermediate gear shaft 201 and the drum shaft 148. The first shift operation gear train 210 includes the four deceleration stages having the plurality of gears 211 to 217 rotatably supported by the assist operation shaft 150 and the intermediate gear shaft 201 individually. The second shift operation gear train 220 includes the acceleration stage constituted by the fifth large-diameter gear 221 and the shift driven gear 222.

The rotation of the shift drive gear 191 of the electric motor 190 is decelerated by the first shift operation gear train 210 and transmitted to the intermediate gear shaft 201. The rotation of the intermediate gear shaft 201 is increased in speed by the second shift operation gear train 220, is transmitted to the shift driven gear 222, and is transmitted to the drum shaft 148 and the drum member 140 which are rotated integrally with the shift driven gear 222. Note that the number of deceleration stages of the first shift operation gear train 210 may be three or more. Alternatively, the second shift operation gear train 220 may be constituted by a deceleration gear train or a constant speed gear train or may be constituted by a gear train of a plurality of stages.

As illustrated in FIG. 3, an assist small-diameter gear 231 is axially supported by the intermediate gear shaft 201 so as not to be relatively rotatable. The assist small-diameter gear 231 meshes with an assist large-diameter gear 232, which is axially supported by the assist operation shaft 150 so as not to be relatively rotatable, to constitute an assist gear train 230. Although the assist gear train 230 is constituted by a deceleration gear train in this embodiment, the assist gear train 230 may be constituted by an acceleration gear train or a constant speed gear train or may be constituted by a gear train of a plurality of stages.

Here, a right end portion of the drum shaft 148, the assist operation shaft 150, and the shift operation gear train 200 are accommodated in a shift gear chamber 805*a* provided on an outer side surface (a right side surface in this embodiment) of the transmission housing 805. The shift gear chamber 805*a* is separated by a partition 805*b* from an internal space of the transmission housing 805 that accommodates the drum main body 141, the shift gears 10, the transmission gears 20, and the like. The shift gear chamber 805*a* is covered with a detachable shift gear chamber cover 806.

The assist operation shaft 150 and the intermediate gear shaft 201 are rotatably supported by the partition 805*b* and the shift gear chamber cover 806. The assist operation shaft 150 is disposed so as to be inserted through the partition 805*b*, one end portion 150*a* (a left end portion in this embodiment) is disposed inside the transmission housing 805, and the other end portion 150*b* (a right end portion in this embodiment) is supported by the shift gear chamber cover 806.

The other end portion 148*b* of the drum shaft 148 is disposed in the shift gear chamber cover 806 through the partition 805*b* from the transmission housing 805. A manual transmission operation portion 147 is disposed on the other end portion 148*b* of the drum shaft 148 so as not to be relatively rotatable. The manual transmission operation portion 147 is disposed so as to be inserted through the shift gear chamber cover 806 that covers the shift operation gear train 200 and is disposed so as to be operable from an outside of the transmission 800. Note that the other end portion 148*b* of the drum shaft 148 may be inserted through the shift gear chamber cover 806, and the manual transmission operation portion 147 may be disposed on the other end portion 148*b*.

Figure 4:
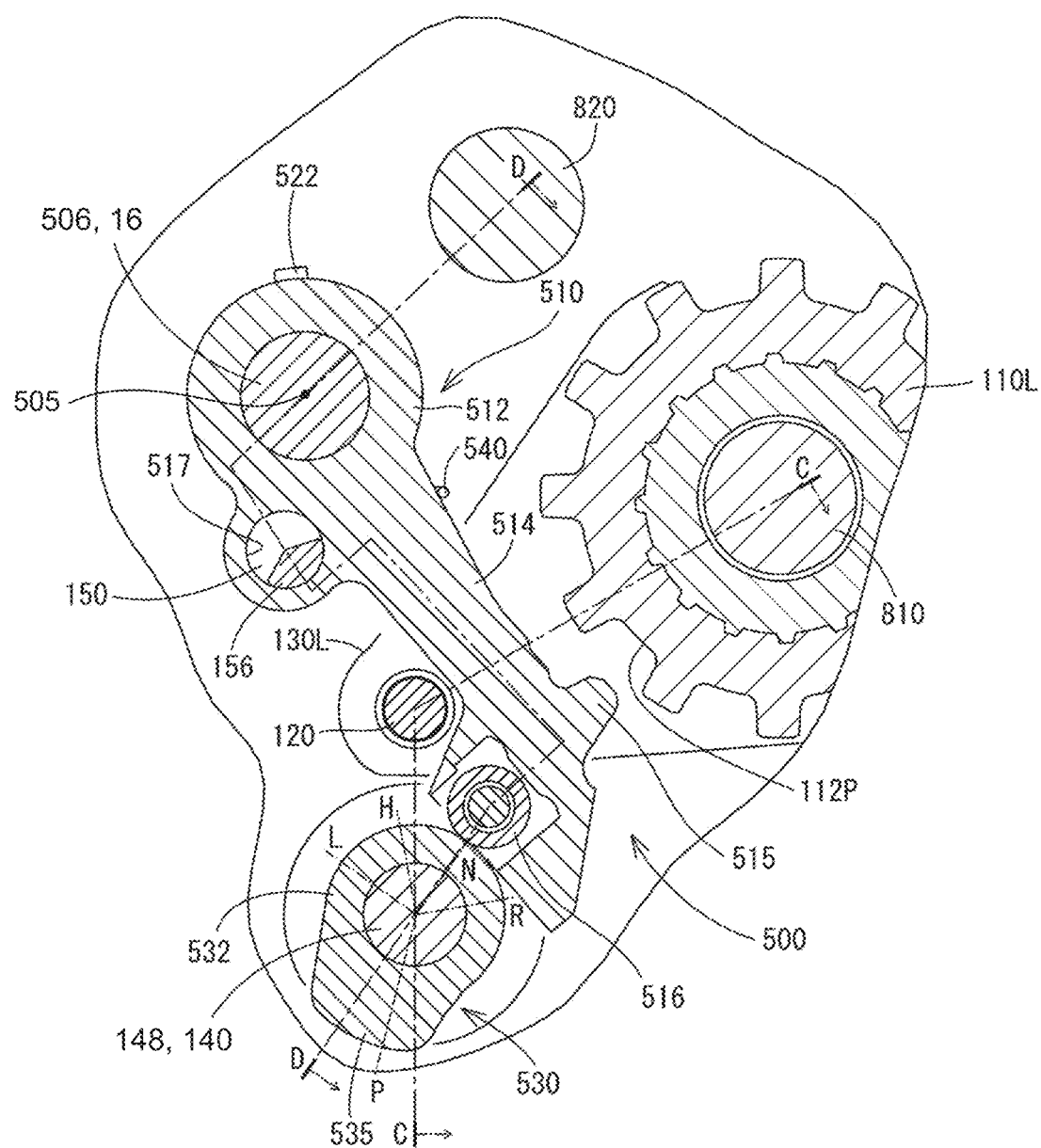
FIG. 4 is a cross-sectional view schematically illustrating a portion corresponding to an A-A position in FIG. 3 and illustrating a park release state.
Figure 5:
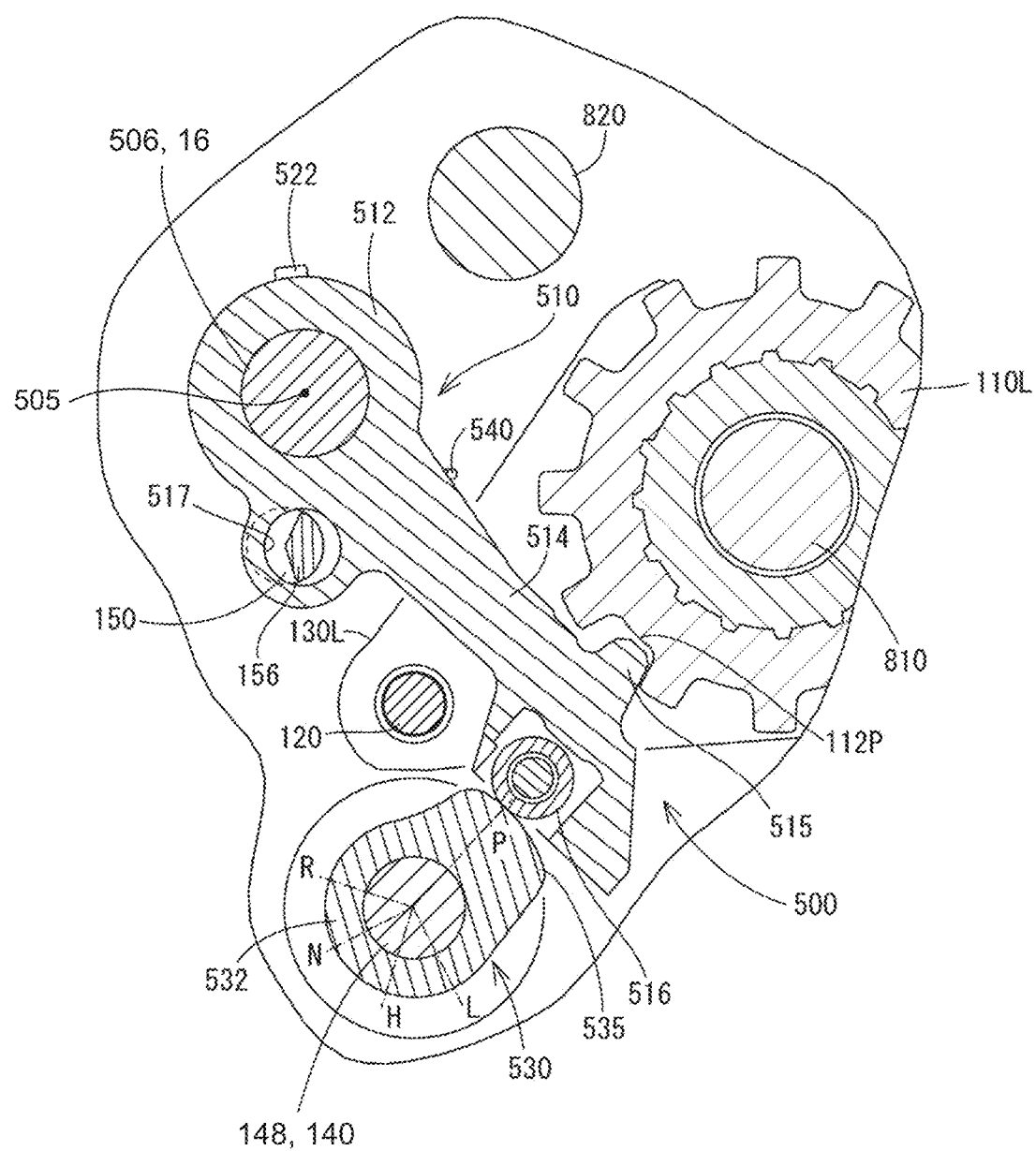
FIG. 5 is a cross-sectional view schematically illustrating the portion corresponding to the A-A position in FIG. 3 and illustrating a parking lock state.

Hereinafter, an example of a park structure of the drum type transmission 1 will be described. FIG. 4 and FIG. 5 are cross-sectional views taken along a line A-A in FIG. 3. A park release state is illustrated in FIG. 4, and a parking lock state is illustrated in FIG. 5.

As illustrated in FIG. 3 to FIG. 5, in the drum type transmission 1, a park concave-convex portion 112P that faces radially outward is disposed on the shifter member (second shifter member 110L) that is moved in the axial direction by the shift fork (second shift fork 130L) and that is engaged with the corresponding shift gear (shift gear 10L) in a concave-convex manner to bring the shift gear into a power transmission state.

In addition, the drum type transmission 1 includes a park lock mechanism 500 that is engaged with the park concave-convex portion 112P in a concave-convex manner to forcibly bring the shifter member (second shifter member 110L) into a rotation stop state. In this embodiment, the second shifter member 110L having the park concave-convex portion 112P also serves as a park gear.

As described above, the drum type transmission 1 is configured such that the shifter member (second shifter member 110L) for engaging and disengaging the power transmission by the corresponding shift gear (shift gear 10L) is also used as the park gear. This makes it possible to achieve a reduction in cost and a reduction in size in the axial direction due to a reduction in the number of components.

Note that a park gear, which is a member separate from the shifter member, may be disposed on the transmission shaft 810 so as to be relatively non-rotatable, and the park concave-convex portion 112P may be disposed on the park gear.

As illustrated in FIG. 3 to FIG. 6, the park lock mechanism 500 includes a park pawl 510 that is swingable about a swing axis 505 extending in parallel to the transmission shaft 810 supporting the second shifter member 110L and that has an engaging portion 515 engageable with the park concave-convex portion 112P at a free end thereof, a park release spring 520 for urging the park pawl 510 in a park release direction about the swing axis 505, and a pawl pushing member 530 (park pawl operation member).

The park pawl 510 can take, about the swing axis 505, a lock position (see FIG. 5) in which the engaging portion 515 is engaged with the park concave-convex portion 112P to forcibly bring the second shifter member 110L into a rotation stop state, and an unlock position (see FIG. 4) in which the engaging portion 515 is separated radially outward from the park concave-convex portion 112P.

The pawl pushing member 530 pushes the park pawl 510 toward a lock position against a biasing force of the park release spring 520 by utilizing a movement of the drum member 140 rotating about the axis toward the park position.

In this embodiment, as illustrated in FIG. 3 to FIG. 5, the pawl pushing member 530 includes a pushing member body portion 532 supported by the drum member 140, and a cam pushing portion 535 extending radially outward from the pushing member body portion 532.

As illustrated in FIG. 4, the cam pushing portion 535 does not act on the park pawl 510 when the drum member 140 is positioned at the transmission position and the neutral position (the reverse position in the illustrated embodiment), and as illustrated in FIG. 5, pushes the park pawl 510 toward the lock position against a biasing force of the park release spring 520 (see FIG. 6) by utilizing a rotational operation of the drum member 140 to the park position.

In this embodiment, as illustrated in FIG. 3 to FIG. 5, the park pawl 510 includes a boss portion 512 which is relatively rotatably fitted onto a pivot shaft 506 defining the swing axis 505, and an arm portion 514 which extends radially outward from the boss portion 512. The engaging portion 515 is formed on a side of the free end portion of the arm portion 514 which faces the park concave-convex portion 112P, and a sliding contact roller 516 with which the pushing member body portion 532 comes into contact is disposed on a side of the arm portion 514 which is opposite to the park concave-convex portion 112P.

Note that, in this embodiment, as illustrated in FIG. 3, a reverse idle shaft 16 that supports a reverse idle gear 15 forming a reverse gear train is used as the pivot shaft 506 that swingably supports the park pawl 510. That is, an axis of the reverse idle shaft 16 constitutes the swing axis 505 of the park pawl 510.

As illustrated in FIG. 6, the park release spring 520 is a coil spring that is fitted onto the pivot shaft 506 in a state in which one end side thereof is operatively connected to the park pawl 510 and the other end side thereof is operatively connected to the pivot shaft 506 (via a pin 522 in this embodiment).

In this embodiment, as described above, when the drum member 140 is rotated from the neutral position to the other side about the axis, the drum member 140 takes the reverse position, and when the drum member 140 is further rotated from the reverse position to the other side about the axis, the drum member 140 takes the park position.

Therefore, when the drum member 140 is located at the reverse position R, the neutral position N, a high-speed position (forward high-speed position) H, or a low-speed position (forward low-speed position) L, the cam pushing portion 535 does not abut on the sliding contact roller 516. When the drum member 140 is rotated from the reverse position R to the park position P, the cam pushing portion 535 abuts on the sliding contact roller 516. As a result, the cam pushing portion 535 pushes the park pawl 510 toward the lock position against a biasing force of the park release spring 520.

As described above, in this embodiment, the pawl pushing member 530 is supported by the drum member 140, and accordingly, the park lock mechanism 500 that pushes the park pawl 510 toward the lock position by using rotation of the drum member 140 to the park position can be made compact.

The drum type transmission 1 according to this embodiment further has the following configuration in order to achieve a standby action in a transmission operation to the park stage.

Specifically, in this embodiment, the pushing member body portion 532 of the pawl pushing member 530 is relatively rotatably fitted onto the drum member 140.

In addition, as illustrated in FIG. 3, the pawl pushing member 530 and the drum member 140 are connected to each other via a park coil spring 540 fitted onto the drum member 140 in a state in which one end side thereof is operatively connected to the pawl pushing member 530 and the other end side thereof is operatively connected to the drum member 140 (via a pin in this embodiment).

When a circumferential load applied to the cam pushing portion 535 is equal to or less than a predetermined value, the park coil spring 540 connects the drum member 140 and the pawl pushing member 530 to each other in a relative rotation unavailable manner so that they rotate integrally with each other in accordance with a rotation of the drum member 140 about the axis. On the other hand, when the circumferential load applied to the cam pushing portion 535 exceeds the predetermined value, the park coil spring 540 is elastically deformed to allow the drum member 140 to rotate about the axis relative to the pawl pushing member 530.

Note that, in this embodiment, the park coil spring 540 is elastically deformed in a diameter reducing direction when the drum member 140 is rotated in advance relative to the pawl pushing member 530.

With this configuration, a standby action can be attained in the transmission operation to the park stage. That is, it is assumed that, when the cam pushing portion 535 swings the park pawl 510 toward the lock position in accordance with a rotation of the drum member 140 to the park position, the engaging portion 515 of the park pawl 510 abuts on a convex portion of the park concave-convex portion 112P of the second shifter member 110L, and the park pawl 510 may not swing to the lock position.

In this case, a circumferential load exceeding a predetermined value is applied to the cam pushing portion 535. Therefore, the drum member 140 is rotated about the axis relative to the pawl pushing member 530 to the park position in advance while the park coil spring 540 is elastically deformed.

The park coil spring 540 in the elastically deformed state has an elastic force that biases the pawl pushing member 530 in a direction to follow the drum member 140. At a stage where the engaging portion 515 and the park concave-convex portion 112P are aligned with each other by the elastic force, the park pawl 510 is swung to the lock position against the biasing force of the park release spring 520. As a result, the engaging portion 515 and the park concave-convex portion 112P engage with each other in a concave-convex manner, and the transmission operation to the park stage is completed (see FIG. 5).

In this embodiment, as illustrated in FIG. 5, when the cam pushing portion 535 positions the park pawl 510 at the lock position and the drum type transmission 1 is in a park stage engagement state, a direction of a reaction force acting on the cam pushing portion 535 from the sliding contact roller 516 substantially faces a direction in which the cam pushing portion 535 extends radially outward with respect to the axis of the drum member 140 (hereinafter, referred to as a stopper function by the cam pushing portion 535).

By providing the stopper function by the cam pushing portion 535, unintentional release of the concave-convex engagement between the engaging portion 515 of the park pawl 510 and the park concave-convex portion 112P may be suppressed or reduced.

More specifically, in a case where the drum type transmission 1 is used in the traveling system transmission path of the work vehicle, it is assumed that the drum member 140 is positioned at the park position so that the drum type transmission 1 is in the park stage engagement state in a state where the work vehicle is positioned on a slope road.

In such a situation, the gravity applied to the work vehicle is reversely transmitted from the drive wheels to the transmission shaft 810, and a rotational drive force about the axis acts on the transmission shaft 810.

In general, a concave portion of the concave-convex engagement structure (a concave portion of the park concave-convex portion 112P in this embodiment) has a tapered cross-sectional shape that becomes narrower radially inward, and a convex portion (the engaging portion 515 of the park pawl 510 in this embodiment) to be engaged with the concave portion has a tapered cross-sectional shape corresponding to the concave portion, so that "facilitation" of the concave-convex engagement is ensured.

On the other hand, when the cross-sectional shapes of the concave portion of the park concave-convex portion 112P and the engaging portion 515 are tapered shapes and a reverse drive force from the drive wheels is transmitted to the transmission shaft 810, the reverse drive force acts to swing the park pawl 510 in the park release direction, and the park pawl 510 located at the lock position is unintentionally swung in the park release direction, so that the concave-convex engagement between the park pawl 510 and the park concave-convex portion 112P may be released.

In this regard, when the stopper function by the cam pushing portion 535 is provided, it is possible to effectively prevent or reduce a situation in which the park pawl 510 is unintentionally swung from the lock position in the release direction.

Furthermore, in this embodiment, as illustrated in FIG. 4 and so on, in a state where the cam pushing portion 535 is not engaged with the park pawl 510, that is, in a state where the drum member 140 is positioned at the operation position in a range from the low-speed position to the reverse position, the pushing member body portion 532 of the pawl pushing member 530 abuts on the park pawl 510 that is biased in the park release direction about the swing axis 505 by the park release spring 520 so as to define a swing end of the park pawl 510 in the park release direction.

As illustrated in FIG. 3 to FIG. 5, the assist operation shaft 150 penetrates the partition 805b of the transmission housing 805 and the shift gear chamber cover 806. One end portion 150a (a left end portion in this embodiment) of the assist operation shaft 150 is disposed in proximity to the park pawl 510 inside the transmission housing 805. In this embodiment, the assist operation shaft 150 is disposed at a position overlapping the park pawl 510 when viewed from the axial direction of the assist operation shaft 150. Then an assist cam 156 disposed on the one end portion 150a of the assist operation shaft 150 is inserted into an engagement hole 517 formed in the arm portion 514 of the park pawl 510.

As illustrated in FIG. 4, the assist cam 156 is disposed on an end surface of one end portion 150a of the assist operation shaft 150. The assist cam 156 is disposed so as to be eccentrically located with respect to the axis of the assist operation shaft 150 and protrudes in the axial direction of the assist operation shaft 150. In this embodiment, the assist cam 156 is formed by cutting out a portion of a peripheral wall of the one end portion 150a of the assist operation shaft 150 and has a substantially fan-shaped cross section.

The assist cam 156 is disposed at one end portion of the assist operation shaft 150 that is rotated by power branched from the shift operation gear train 200. The drum type transmission 1 includes the assist gear train 230 for branching and transmitting the power of the intermediate gear shaft 201 to the assist operation shaft 150. Therefore, the rotation of the shift drive gear 191 driven by the electric motor 190 is transmitted to the intermediate gear shaft 201 by the first shift operation gear train 210 of the shift operation gear train 200. A rotation of the intermediate gear shaft 201 is transmitted to the drum shaft 148 by the second shift operation gear train 220 and is transmitted to the assist operation shaft 150 by the assist gear train 230. That is, the assist operation shaft 150 is also rotated in accordance with the rotation of the drum member 140.

As illustrated in FIG. 4, the park pawl 510 is configured not to hinder the rotation of the assist operation shaft 150 (the rotational displacement of the assist cam 156) in the park release state in which the park pawl 510 is positioned at the lock release position. In this embodiment, the engagement hole 517 of the park pawl 510 has a form of a circular through-hole having a diameter slightly larger than a shaft diameter of the assist operation shaft 150 and is formed so as to substantially overlap a contour of the assist operation shaft 150 when viewed from the axial direction of the assist operation shaft 150 in the park release state. As a result, when the drum member 140 is rotationally displaced between the reverse position R and the low-speed position L, the assist cam 156 is prevented from contacting an inner peripheral wall of the engagement hole 517, and an increase in operation resistance of the drum member 140 can be prevented.

As illustrated in FIG. 5, in the parking lock state where the park pawl 510 is located at the lock position, the engagement hole 517 is located closer to the second shifter member 110L (park gear) than the position in the park release state (see FIG. 4). When viewed from the axial direction of the assist operation shaft 150, a portion of the inner peripheral wall of the engagement hole 517 intersects with a movement locus of the assist cam 156 when the drum shaft 148 is rotated between the park position and the reverse position.

The assist cam 156 is configured to come into contact with the inner peripheral wall of the engagement hole 517 when the drum member 140 is rotated from the park position P toward the reverse position R so as to bias the park pawl 510 toward the lock release position.

According to the drum type transmission 1 of this embodiment, when the drum member 140 is rotated from the park position toward the transmission position or the neutral position (the reverse position R in this embodiment), the lock release mechanism by the spring force of the park release spring 520 and the lock release mechanism by the assist cam 156 disposed on the assist operation shaft 150 are provided. Thus, even when the parking state is not released only by a biasing force of the park release spring 520 and a reaction force received by the park pawl 510 from the second shifter member 110L (park gear), the parking lock state can be reliably released by the action of the assist cam 156. As a result, the reliability of the park lock mechanism 500 in the drum type transmission 1 can be improved.

Furthermore, since the assist cam 156 is disposed on the assist operation shaft 150 which is interlockingly connected to the drum member 140 and the pawl pushing member 530, two lock release mechanisms can be operated by a single operation system (operation of the assist operation shaft 150). That is, the lock release mechanism by the assist cam 156 can be provided without separately adding an operation system to the operation system for operating the rotation of the drum member 140 and the pawl pushing member 530 by using the assist operation shaft 150, and the reliability of the park lock mechanism 500 in the drum type transmission 1 can be improved with a simple configuration and at low cost.

Furthermore, the assist cam 156 is disposed on the assist operation shaft 150 positioned in an upstream portion of a transmission path of a rotational force for rotating the drum member 140. Therefore, when the drum member 140 is rotated from the park position toward the transmission position or the neutral position, the release operation force input to the assist operation shaft 150 can be transmitted to the park pawl 510 without being reduced, and a significant increase in the release operation force can be suppressed.

Furthermore, in the drum type transmission 1 of this embodiment, since the assist cam 156 is formed by cutting out the one end portion 150a of the assist operation shaft 150, the assist cam 156 can be provided on the assist operation shaft 150 without increasing the number of components, and the reliability of the park lock mechanism 500 in the drum type transmission 1 can be improved with a low-cost and compact configuration without causing a significant increase in manufacturing cost.

Note that the assist cam 156 may bias the park pawl 510 toward the lock release position when the park lock is to be released, or may bias the park pawl 510 toward the lock release position only when the park pawl 510 is not to be separated from the park concave-convex portion 112P even when the cam pushing portion 535 of the pawl pushing member 530 is separated from the park pawl 510.

Furthermore, the cross-sectional shape of the assist cam 156 is not limited to the substantially fan-like shape, and may be another shape, such as a circular shape. Instead of the assist cam 156 formed integrally with the assist operation shaft 150, another member that can bias the park pawl 510 toward the lock release position when the drum member 140 is moved from the park position to the transmission position or the neutral position may be attached to the one end portion 150a of the assist operation shaft 150 to constitute an assist cam.

Furthermore, the engagement hole 517 with which the assist cam 156 comes into contact in the park pawl 510 is not limited to a circular shape, and may have another shape, such as an L-shaped groove, or may be open to an outer peripheral side surface of the park pawl 510. Moreover, the portion of the park pawl 510 with which the assist cam 156 is brought into contact may be located at a portion of an outer peripheral side surface of the park pawl 510 which is opposed to the second shifter member 110L while the assist cam 156 is disposed between the park pawl 510 and the second shifter member 110L (park gear).

The drum type transmission 1 of this embodiment includes the transmission shaft 810 having the plurality of shift gears 10H, 10L, and 10R, the drum member 140 that is rotated about the drum shaft 148 so as to be shifted to the park position, the neutral position, and the transmission position, and the shift operation gear train 200 that transmits a drive force of the electric motor 190 to the drum shaft 148. Furthermore, the drum type transmission 1 has the park lock mechanism 500 including the park pawl 510 engaged with and disengaged from the park concave-convex portion 112P of the second shifter member 110L (park gear) relatively non-rotatably disposed on the transmission shaft 810, the pawl pushing member 530 (park pawl operation member) for engaging the park pawl 510 with the park concave-convex portion 112P when the drum member 140 is in the park position and for disengaging the same therefrom when the drum member 140 is out of the park position, and the assist cam 156 for assisting a movement in a direction for disengaging the park pawl 510 from the park concave-convex portion 112P when the drum member 140 is rotated from the park position toward the transmission position or the neutral position or a direction in which the park pawl 510 is engaged with the park concave-convex portion 112P when a rotation operation is performed from the transmission position or the neutral position toward the park position. Then the assist cam 156 is disposed at the one end portion 150a of the assist operation shaft 150 that is rotated by power branched from the shift operation gear train 200.

When a torque is confined between the park pawl 510 and the park concave-convex portion 112P, the parking lock may not be released while the two are engaged with each other.

In the drum type transmission 1 according to the present invention, a separate path for releasing the park pawl 510 is provided separately from a main path (for locking the park pawl 510) connecting the electric motor 190 to the drum shaft 148. Since the park pawl 510 can be surely released by forcibly moving the park pawl 510 in the separate path, the reliability of the park lock mechanism 500 can be improved. Furthermore, since the assist cam 156 is disposed on the one end portion 150a of the assist operation shaft 150 which is rotated by the power (separate path) branched from the shift operation gear train 200 (main path), the assist cam 156 can be operated with a simple configuration.

Furthermore, the intermediate gear shaft 201 is disposed between the assist operation shaft 150 and the drum shaft 148 in parallel to each other, and the shift operation gear train 200 includes the first shift operation gear train 210 for transmitting power between the intermediate gear shaft 201 and the output shaft of the electric motor 190, and the second shift operation gear train 220 for transmitting power between the intermediate gear shaft 201 and the drum shaft 148. Furthermore, the assist gear train 230 for branching and transmitting the power of the intermediate gear shaft 201 to the assist operation shaft 150 is disposed. Moreover, the first shift operation gear train 210 includes the plurality of gears 211 to 217 individually supported by the assist operation shaft 150 and the intermediate gear shaft 201 so as to be freely rotatable.

In the drum type transmission 1, the shift operation gear train 200 connected from the electric motor 190 to the drum shaft 148 can be formed by using the assist operation shaft 150 including the assist cam 156 on the one end portion 150a. Thus, the assist operation shaft 150 having the assist cam 156 can be disposed without increase in the number of components, and the reliability of the park lock mechanism 500 in the drum type transmission 1 can be improved with a low-cost and compact configuration without causing a significant increase in manufacturing cost.

Furthermore, in the drum type transmission 1, the other end portion 148b of the drum shaft 148 extends to the outside of the shift gear chamber cover 806 covering the shift operation gear train 200, and the manual transmission operation portion 147 is relatively non-rotatably disposed on the other end portion 148b of the drum shaft 148. The manual transmission operation portion 147 may have a shape like a hexagonal nut, for example.

Accordingly, when the electric motor 190 becomes inoperable, the operator can manually operate the manual transmission operation portion 147 using a spanner or the like to rotate the drum shaft 148 and perform a gear shift operation. Furthermore, even when a drive force of the electric motor 190 is insufficient at a time of releasing the parking lock state and the parking lock state is not restored, the operator can manually operate the manual transmission operation portion 147 to rotate the assist operation shaft 150 via the drum shaft 148 and the assist gear train 230 to operate the assist cam 156, so that the parking lock state can be forcibly released.

Note that the manual transmission operation portion 147 may be disposed on the one end portion 148a of the drum shaft 148. In this case, the angle sensor 146 is preferably attached to the other end portion 148b of the drum shaft 148.

Furthermore, in the drum type transmission 1, an electric gear shift module including the assist operation shaft 150, the electric motor 190, the shift operation gear train 200, and the shift gear chamber cover 806 may be changed to the manual gear shift module illustrated in Patent Document 2. In this case, the angle sensor 146 may be attached to the other end portion 148b of the drum shaft 148.

Moreover, although the assist cam 156 according to this embodiment biases the park pawl in a direction away from the park gear, an assist cam according to another embodiment may bias the park pawl in a direction in which the park pawl meshes with the park gear when the drum member is rotated from the transmission position or the neutral position toward the park position so that the parking lock state can be strongly maintained.

The present invention is not limited to the above-described embodiment and can be embodied in various forms. The configurations of the individual components are not limited to those in the illustrated embodiment, and various modifications may be made without departing from the scope of the present invention. For example, the individual components described in the above-described embodiment and the modifications (note that, etc.) may be combined, and addition, omission, replacement, and other modifications of the components may be performed.

REFERENCE SIGNS LIST

1 DRUM TYPE TRANSMISSION DEVICE
10, 10H, 10L, 10R SHIFT GEAR
110L SECOND SHIFTER MEMBER (EXAMPLE OF PARK GEAR)
112P PARK CONCAVE-CONVEX PORTION
140 DRUM MEMBER
147 MANUAL TRANSMISSION OPERATION PORTION
148 DRUM SHAFT
150 ASSIST OPERATION SHAFT
150a ONE END PORTION OF ASSIST OPERATION SHAFT
156 ASSIST CAM
190 ELECTRIC MOTOR
191 SHIFT DRIVE GEAR
200 SHIFT OPERATION GEAR TRAIN
201 INTERMEDIATE GEAR SHAFT
210 FIRST SHIFT OPERATION GEAR TRAIN
220 SECOND SHIFT OPERATION GEAR TRAIN
230 ASSIST GEAR TRAIN
500 PARK LOCK MECHANISM
510 PARK PAWL
530 PAWL PUSHING MEMBER (PARK PAWL OPERATION MEMBER)
810 TRANSMISSION SHAFT

The invention claimed is:

1. A drum type transmission including a transmission shaft having a plurality of shift gears, a drum member that is rotated about a drum shaft so that a shift operation is performed to a park position, a neutral position, or a transmission position, and a shift operation gear train for transmitting a drive force of an electric motor to the drum shaft, the drum type transmission comprising:
   a park pawl that is engaged with and disengaged from a park gear disposed on the transmission shaft in a relative rotation unavailable manner;
   a park pawl operation member that engages the park pawl with the park gear when the drum member is in the park position and disengages the park pawl from the park gear when the drum member is out of the park position; and
   an assist cam that assists a movement of the drum member in a direction in which the park pawl is disengaged from the park gear when the drum member is rotated from the park position toward the transmission position or the neutral position, or in a direction in which the park pawl is engaged with the park gear when the drum member is rotated from the transmission position or the neutral position toward the park position, wherein
   the assist cam is disposed at one end portion of an assist operation shaft which is rotated by power branched from the shift operation gear train.

2. The drum type transmission according to claim 1, further comprising:
   an intermediate gear shaft that is positioned between the assist operation shaft and the drum shaft and that extends in parallel to the assist operation shaft and the drum shaft;
   a first shift operation gear train that transmits power between the intermediate gear shaft and an output shaft of the electric motor, and a second shift operation gear train that transmits power between the intermediate gear shaft and the drum shaft, the first and second shift operation gear trains constituting the shift operation gear train; and an assist gear train that transmits power between the intermediate gear shaft and the assist operation shaft.

3. The drum type transmission according to claim 2, wherein the first shift operation gear train includes a plurality of gears that are individually supported to be freely rotatable by the assist operation shaft and the intermediate gear shaft.

4. The drum type transmission according to claim 1, wherein an end portion of the drum shaft extends to an outside of a cover that covers the shift operation gear train, and a manual transmission operation portion is disposed on the end portion in a relative rotation unavailable manner.

* * * * *